United States Patent
Beer et al.

(10) Patent No.: US 6,539,705 B2
(45) Date of Patent: Apr. 1, 2003

(54) METHOD FOR MONITORING AND EXHAUST-GAS CATALYTIC CONVERTER OF AN INTERNAL COMBUSTION ENGINE

(75) Inventors: Johannes Beer, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/141,682

(22) Filed: May 8, 2002

(65) Prior Publication Data

US 2003/0010016 A1 Jan. 16, 2003

Related U.S. Application Data

(63) Continuation of application No. PCT/DE00/03868, filed on Nov. 3, 2000.

(30) Foreign Application Priority Data

Nov. 8, 1999 (DE) .......................... 199 53 601

(51) Int. Cl.$^7$ ............................................. F01N 3/00
(52) U.S. Cl. ............................ 60/274; 60/276; 60/277
(58) Field of Search .......................... 60/274, 276, 277, 60/285, 301

(56) References Cited

U.S. PATENT DOCUMENTS 6,003,307 A * 12/1999 Naber et al. ............... 60/274
6,209,316 B1 * 4/2001 Duvinage et al. ......... 60/274
6,363,715 B1 * 4/2002 Bidner et al. ............. 60/285

FOREIGN PATENT DOCUMENTS

| DE | 23 28 459 | 1/1975 |
|---|---|---|
| DE | 195 43 219 C1 | 12/1996 |
| DE | 196 06 652 A1 | 8/1997 |
| DE | 198 01 815 A1 | 7/1999 |
| DE | 198 19 461 A1 | 11/1999 |
| DE | 199 31 321 A1 | 1/2001 |

* cited by examiner

*Primary Examiner*—Thomas Denion
*Assistant Examiner*—Binh Tran
(74) *Attorney, Agent, or Firm*—Laurence A. Greenberg; Werner H. Stemer; Ralph E. Locher

(57) ABSTRACT

To monitor an exhaust-gas catalytic converter when the internal combustion engine is at its operating temperature, an NOx sensor is used to determine the NOx concentration downstream of the exhaust-gas catalytic converter which is to be diagnosed. During the diagnosis time, the oxygen loading of the exhaust-gas catalytic converter is increased, and the conversion ability of the exhaust-gas catalytic converter is worked out from the NOx concentration which is measured during a plurality of lambda controller oscillations.

13 Claims, 3 Drawing Sheets

METHOD FOR MONITORING AND EXHAUST-GAS CATALYTIC CONVERTER OF AN INTERNAL COMBUSTION ENGINE

CROSS-REFERENCE TO RELATED APPLICATION

This application is a continuation of copending International Application PCT/DE00/03868, filed Nov. 3, 2000 which designated the United States and which was not published in English.

BACKGROUND OF THE INVENTION

Field of the Invention

The invention relates to a method for monitoring an exhaust-gas catalytic converter of an internal combustion engine, that is, to a method for monitoring the conversion capacity of an exhaust-gas catalytic converter which is disposed in an exhaust pipe of an internal combustion engine and has a lambda control device, which has a wide-band lambda sensor arranged upstream of the exhaust-gas catalytic converter and controls the air/fuel ratio to a predeterminable set value.

To monitor exhaust-gas catalytic converters for internal combustion engines, there are known methods which use the oxygen storage capacity (OSC method) of the catalytic converter. The storage capacity correlates with the hydrocarbon (HC) conversion in the catalytic converter. If the catalytic converter has good conversion capacities, the lambda fluctuations upstream of the catalytic converter, which are generated by the lambda controller and are recorded by a first lambda sensor, are smoothed by the oxygen storage capacity of the catalytic converter. If the conversion properties of the catalytic converter are reduced or eliminated as a result of aging, poisoning by leaded fuel or by misfires, the control oscillation which is present upstream of the catalytic converter is passed on to the lambda sensor downstream of the catalytic converter. A conclusion can be drawn as to whether the catalytic converter is functional or defective by comparing the signal amplitudes from the two lambda sensors (e.g. German published patent application DE 23 28 459 A1).

In vehicles which are certified in accordance with the stringent ULEV (ultra-low emission vehicle) or SULEV (super ultra-low emission vehicle) limit values, deteriorations in the conversion rate of even a few percent lead to the diagnosis limit values being exceeded. However, relatively low amplitude ratios are determined at these conversion rates. Consequently, it is no longer possible to reliably distinguish between a defective catalytic converter and a functional catalytic converter, in particular taking account of series production scatter and the nonlinear correlation between oxygen storage capacity and HC conversion. Moreover, in the future catalytic converter monitoring for the emission of nitrogen oxides (NOx) will also be demanded.

An NOx sensor offers the possibility of drawing conclusions both as to the HC conversion properties and as to the NOx conversion properties of a catalytic converter from the measured NOx concentration. Our earlier, commonly assigned application No. 10/042,105 (German patent application DE 199 31 321) describes a method for monitoring a three-way exhaust-gas catalytic converter wherein the signal from an NOx sensor arranged downstream of the catalytic converter is evaluated while the internal combustion engine is warming up. For this purpose, a sum value is formed from the measured NOx concentration from the beginning of the time at which the internal combustion engine is started up until a time at which the NOx concentration falls below a predetermined threshold value, and the sum value is compared with a predetermined threshold value. If the threshold value is exceeded, it is concluded that the exhaust-gas catalytic converter has aged. This method therefore describes a light-off diagnosis for the catalytic converter.

SUMMARY OF THE INVENTION

It is accordingly an object of the invention to provide a method of monitoring the exhaust gas catalytic converter of an internal combustion engine, which overcomes the above-mentioned disadvantages of the heretofore-known devices and methods of this general type and which provides an accurate method for monitoring the conversion capacity of an exhaust-gas catalytic converter which makes do without expensive temperature sensors and without a second lambda sensor, and provides reliable results in steady-state operation of the internal combustion engine.

With the foregoing and other objects in view there is provided, in accordance with the invention, a method of monitoring a conversion capacity of an exhaust-gas catalytic converter of an internal combustion engine, wherein a lambda control device, having a wide-band lambda sensor disposed upstream of the exhaust-gas catalytic converter, and regulating an air/fuel ratio to a predeterminable set value, the method which comprises:

in steady-state operation, and with the internal combustion engine at operating temperature, increasing an oxygen loading of the exhaust-gas catalytic converter to a predetermined value during a diagnosis time by a control intervention of the lambda control device;

recording a NOx concentration in an exhaust downstream of the three-way exhaust-gas catalytic converter with a NOx sensor during the diagnosis time;

determining a steady-state diagnosis value from the values of the NOx concentration during at least one lambda controller oscillation;

comparing the diagnosis value with a predetermined threshold value; and if the threshold value is exceeded, concluding that the exhaust-gas catalytic converter has aged.

The present invention is based on the idea of monitoring an exhaust-gas catalytic converter by using an NOx sensor for determining the NOx concentration during steady-state operation of the internal combustion engine downstream of the exhaust-gas catalytic converter which is to be diagnosed.

In this method, with the aid of a lambda control device, which has a wide-band lambda sensor arranged upstream of the exhaust-gas catalytic converter and controls the air/fuel ratio to a predeterminable set value, in steady-state operation, with the internal combustion engine at operating temperature, the oxygen loading of the exhaust-gas catalytic converter is increased to a predetermined value during a diagnosis time by a control intervention of the lambda control device. Then, during the diagnosis time the NOx concentration in the exhaust pipe downstream of the three-way exhaust-gas catalytic converter is recorded by means of the NOx sensor, and a steady-state diagnosis value is determined from the values of the NOx concentration during at least one lambda controller oscillation. The diagnosis value is compared with a predetermined threshold value, and if the threshold value is exceeded, it is concluded that the exhaust-gas catalytic converter has aged.

To increase the accuracy of diagnosis, it is advantageous to evaluate not just one controller oscillation, but rather a number of these oscillations, and then to form the mean.

It is possible for both half-waves of the lambda controller oscillation or only the positive half-wave ("lean half-wave"), during which the signal from the lambda sensor indicates a lean air/fuel mix, to be evaluated.

In accordance with an added feature of the invention, the diagnosis value is determined according to the following relationship:

$$D_{stat} = \frac{1}{n_{periods}} \int_{t_{start}}^{t_{start}+n_{periods} \cdot t_{periods}} |C_{NOx}(t)| \cdot C_{weighting}(MAF, N) \cdot dt$$

where $D_{stat}$ is the diagnosis value;

$n_{periods}$ is a number of complete periods of the lambda controller;

$t_{period}$ is a period time of a complete lambda controller oscillation;

$t_{start}$ is a start of diagnosis;

$c_{NOx}$ is the NOx concentration; and $c_{weighting}$ is a weighting factor.

Alternatively, the diagnosis value is determined according to the following relationship:

$$D_{stat} = \frac{1}{n_{periods}} \int_{t_{start}}^{t_{start}+n_{periods} \cdot t_{periods}} |C_{NOx}(t)| \cdot C_{weighting}(MAF, N) \cdot \theta[U_{th\_bin} - U_{nox\_bin}(t)] dt$$

where the additional factors are:

$U_{th\_bin}$ a lean threshold for the binary signal of the NOx sensor;

$U_{nox\_bin}$ a binary signal from the NOx sensor; and $$\theta(x) = \begin{cases} 1 & \text{for } x \geq 0 \\ 0 & \text{for } x < 0 \end{cases}$$

is a heaviside function.

In accordance with again another feature of the invention, the method comprises choosing for the predetermined value an oxygen loading at which there is as yet no noticeable rise in the NOx concentration downstream of the exhaust-gas catalytic converter for a new exhaust-gas catalytic converter or for a borderline catalytic converter that is still classified as functional.

In accordance with a further feature of the invention, the value is predetermined experimentally and stored in a memory device of a control device controlling the internal combustion engine.

In accordance with again a further feature of the invention, the diagnosis value for steady-state operation of the internal combustion engine is linked to a diagnosis value while the internal combustion engine is warming up, to form a total diagnosis value.

In accordance with again an additional feature of the invention, the total diagnosis value is formed according to the following relationship:

$$\frac{D_{light-off}}{S_{light-off}} \cdot F_{light-off} + \frac{D_{stat}}{S_{stat}} \cdot F_{stat} = D_{total}$$

where $D_{total}$ is the total diagnosis value;

$D_{light-off}$ is a diagnosis value for a known diagnosis method while the internal combustion engine is warming up;

$S_{light-off}$ is a diagnosis threshold for a method of this type; and $F_{light-off}$, $F_{stat}$ are weighting factors In accordance with a concomitant feature of the invention, the total diagnosis value $D_{total}$ is compared with a threshold value, and a fault indicator device is activated when the threshold value is exceeded.

The method has the particular advantage that it allows diagnosis of catalytic converters with a high degree of accuracy even if stringent exhaust-gas limit values are to be observed.

Other features which are considered as characteristic for the invention are set forth in the appended claims.

Although the invention is illustrated and described herein as embodied in method for monitoring an exhaust gas catalytic converter of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
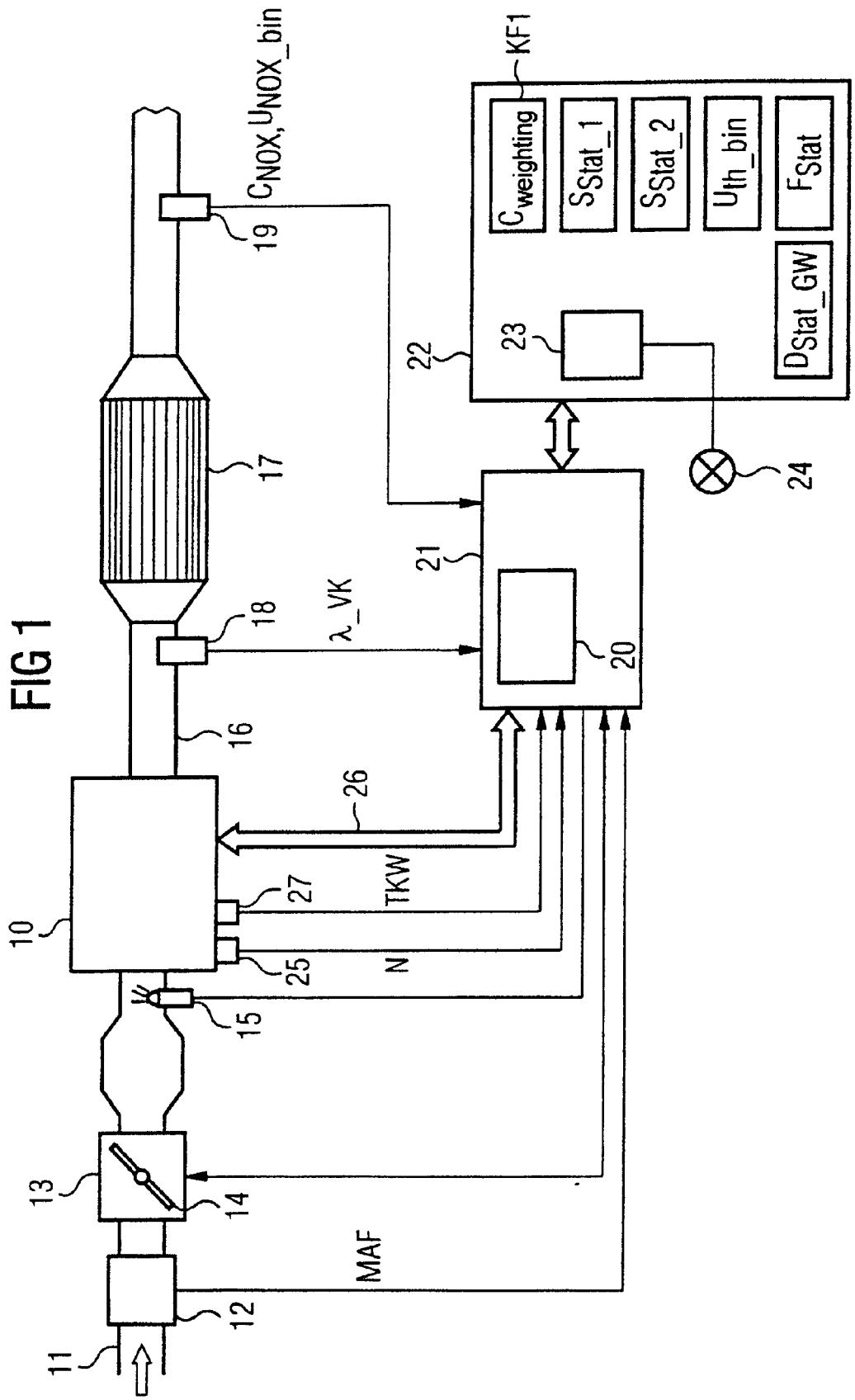
FIG. 1 is a schematic block circuit diagram of an internal combustion engine with associated exhaust-gas aftertreatment installation.

Referring now to the figures of the drawing in detail and first, particularly, to FIG. 1 thereof, there is shown a highly simplified block circuit diagram illustrating an internal combustion engine with an associated exhaust-gas aftertreatment installation wherein the method according to the invention is employed. Only those components which are necessary in order to understand the invention are illustrated. In particular, the fuel circuit has not been illustrated.

The air required for combustion is fed to an internal combustion engine 10 via an induction duct 11 or intake duct 11. A load sensor, in the form of an air mass flowmeter 12, a throttle valve block 13 having a throttle valve 14 and a set of injection valves 15 matching the number of cylinders, of which only one valve is shown, are arranged in succession, as seen in the direction of flow of the intake air, in the induction duct 11. However, the method according to the invention can also be applied in a system which has only one injection valve for all the cylinders (central injection system, single point injection system) or wherein the fuel is injected directly into the associated cylinders (direct injection, highpressure injection). On the output side, the internal combustion engine 10 is connected to an exhaust pipe 16, wherein an exhaust-gas catalytic converter 17 is disposed. This may be any desired type of exhaust-gas catalytic converter which has an oxygen storage capacity, and in particular it is possible to provide a three-way catalytic converter or an NOx storage catalytic converter. In the latter case, a catalytic converter connected upstream of the NOx storage catalytic converter should then not have any oxygen storage capacity.

The sensor system for the exhaust-gas aftertreatment includes, inter alia an oxygen measurement sensor arranged upstream of the exhaust-gas catalytic converter 17, in the form of a lambda sensor 18, and an NOx sensor 19 arranged downstream of the exhaust-gas catalytic converter. The NOx sensor 19, which is of a known type, supplies an output signal $C_{NOx}$, which correlates to the NOx concentration in the exhaust gas, and a binary output signal $U_{NOx\_bin}$, which indicates whether the mix is lean or rich compared to the stoichiometric air/fuel ratio. What is known as a wide-band lambda sensor (linear lambda sensor), which outputs a continuous, for example linear output signal as a function of the oxygen content in the exhaust gas in the region around lambda=1, is fitted as the oxygen sensor 18. The signal from this lambda sensor 18 is used to control the mix according to the set value stipulations. This function is performed by a lambda control device 20, which is known per se and is preferably integrated in a control device 21 which controls and regulates operation of the internal combustion engine. Electronic control devices 21 of this type, which generally include one or more microprocessors and, in addition to fuel injection and ignition control, are also responsible for a wide range of further control and regulation tasks, including monitoring the exhaust-gas aftertreatment system, are known per se, and consequently only the structure which is relevant in connection with the invention, and the way wherein this functions, will be dealt with in the text which follows. In particular, the control device 21 is connected to a memory device 22, wherein, inter alia, various characteristic diagrams and threshold values are stored, the importance of which will be explained in more detail with reference to the description of the following figures.

The memory device 22 also comprises a fault memory 23, which is assigned a fault indicator device 24. This fault indicator device 24 is preferably produced as a malfunction indication lamp (MIL), which is arranged on the dashboard of the vehicle and illumination of which indicates a malfunction of a component which is relevant to the exhaust system.

The rotational speed N of the internal combustion engine 10 is recorded with the aid of a rotational-speed sensor 25, and the temperature of the internal combustion engine 10 is recorded via the temperature of the coolant TKW by means of a temperature sensor 27. These signals are likewise fed to the control device 21 for further processing, as are the output signal MAF from the air mass flowmeter, the signal $\lambda\_VK$ from the lambda sensor 18 and the output signals $C_{NOx}$ and $U_{NOx\_bin}$ from the NOx sensor 19. The latter signals are preferably transmitted via a bus (e.g. CAN).

In order to control the internal combustion engine 10, the control device 21 is also connected, via a data and control line 26, to further sensors and actuators. Those additional devices are not specifically illustrated for purpose of providing the necessary clarity in this description.

If the lambda control is active when the internal combustion engine is at operating temperature (0.997≦λ≧0.999), a diagnosis is carried out in the quasi-steady operating states.

It is concluded that a quasi-steady state is present for example if the coolant temperature TKW has reached a predetermined threshold value and a defined air mass flow rate MAF lies within predetermined limits. For this purpose, the signal from the temperature sensor 27 and the signal from the air mass flowmeter 12 are evaluated. With the aid of the linear lambda control, a lambda variation about λ=1 is carried out for a defined diagnosis time, which is a multiple of a lambda controller oscillation, in such a manner that the oxygen loading of the exhaust-gas catalytic converter 17 rises to a predetermined value. This value results as the oxygen loading at which, for a new catalytic converter or, by definition, an OBD (on-board diagnosis) limit catalytic converter which is still classified as functional, there is as yet no noticeable rise in the NOx concentration downstream of the exhaust-gas catalytic converter. The value $D_{stat\_GW}$, which has been determined experimentally by tests, is stored in the memory device 22. An aged exhaust-gas catalytic converter has a considerably increased NOx sensor signal at the same oxygen loading, on account of the reduced oxygen storage capacity.

Therefore, for the purpose of diagnosis, the loading of the exhaust-gas catalytic converter with oxygen is increased by an intervention in the lambda control by means of the linear lambda sensor 18 (control sensor), for example is set to a value of λ=0.998. As a result, the conversion rate for the pollutants does not leave the catalytic converter window, i.e. the area with the highest possible conversion rate. Simply, a higher oxygen loading is selected than for standard operation, in order to better differentiate during diagnosis between an exhaust-gas catalytic converter which is still functional and an exhaust-gas catalytic converter which can no longer be tolerated in view of aging. Unlike lambda control using a binary lambda sensor, wherein the maximum frequency is predetermined by means of the dead time of the system and the amplitude of the oscillation can be set by means of the P-jump delay time and by means of the I proportion of the controller, when using the linear lambda control one has the advantage that the oxygen loading of the catalytic converter can be set as desired. Since the diagnosis takes place at a defined air mass flow rate and at a defined setting of the lambda controller parameters, i.e. of the amplitude and frequency of the controller oscillation, the result is an oxygen loading which is reproducible. This is a precondition for an accurate diagnosis result.

Figure 2:
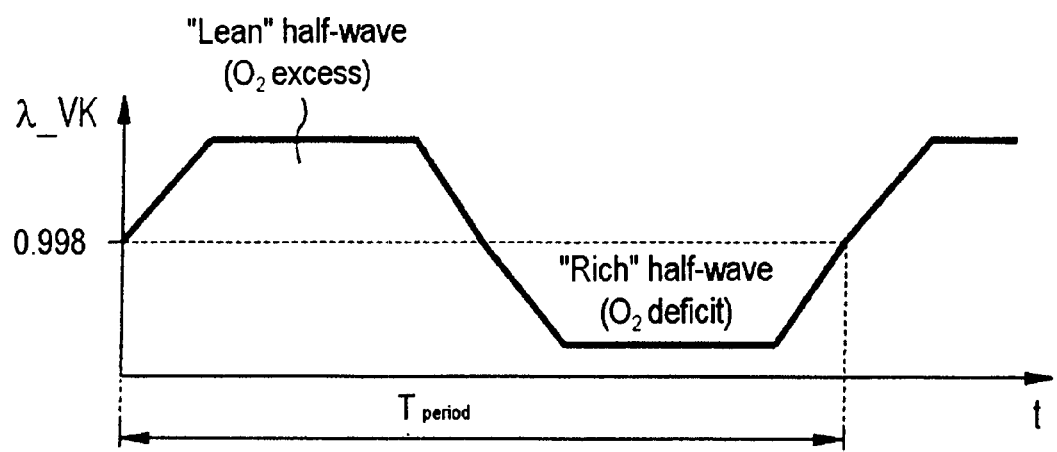
FIG. 2, with its two partial views 2A and 2B, shows diagrams illustrating the time curve of the output signal from the lambda sensor upstream of the catalytic converter and from the NOx sensor downstream of the catalytic converter when both half-waves of the lambda controller oscillation are being evaluated.
Figure 2:
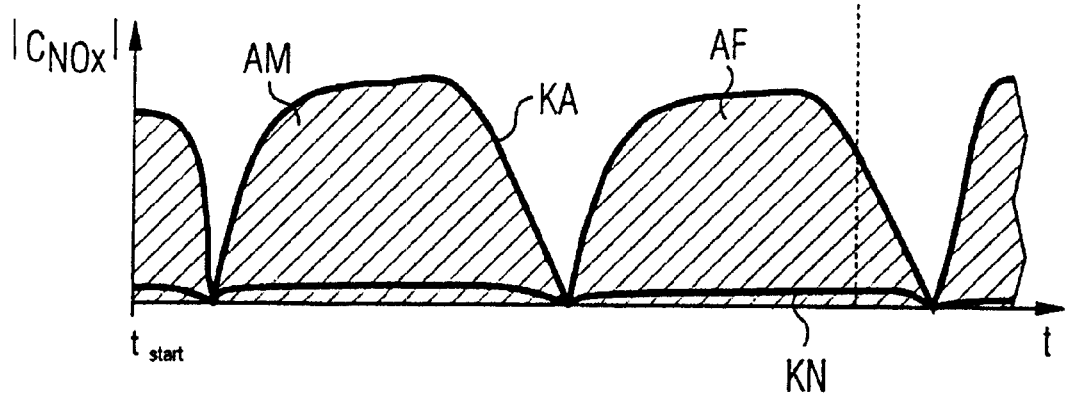

A first exemplary embodiment of the diagnosis method is explained with reference to FIG. 2. The partial view FIG. 2A shows the time curve for the signal $\lambda\_VK$, as supplied by the lambda sensor 18 upstream of the catalytic converter 17, during a period time $T_{period}$ of the lambda controller oscillation. The set value for the air ratio λ is in this case set to the abovementioned value of 0.998. The half-wave of the oscillation which lies above this value is referred to as the "lean half-wave", while the half-wave of the oscillation which lies below this value is referred to as the "rich half-wave". During the lean half-wave there is an excess of oxygen, and during the rich half-wave there is a deficit of oxygen. The time for a complete oscillation, comprising the lean and rich half-waves, is denoted by $T_{period}$.

The partial view FIG. 2B shows, as curve KA, the time curve for the output signal C_NOx from the NOx sensor 19, which is established as a result of the selected lambda value, for an aged catalytic converter, the curve KN shows the time curve for a new catalytic converter with unlimited conversion ability. It should be noted that in this illustration an offset has been eliminated when plotting the signal C_NOx from the from the NOx sensor 19. The hatched area which is delimited by the curve KA and the abscissa is denoted by AM and characterizes the integral value during the lean half-wave of an aged exhaust-gas catalytic converter, while the area between the curve KN and the abscissa indicates the integral value during the lean half-wave of a new exhaust-gas catalytic converter. This area is considerably smaller. The hatched area AF which is delimited by the curve KA and the abscissa characterizes the integral value during the rich half-wave of an aged exhaust-gas catalytic converter. In this case too, the area which is delimited by the curve KN and the abscissa in the rich half-wave is considerably smaller for a new exhaust-gas catalytic converter. From the start of diagnosis until time $t_{start}$, the sensor signal C_NOx during both half-waves is evaluated during the variation of the oxygen loading.

The following text describes how a stationery diagnosis value $D_{stat}$ is calculated in this exemplary embodiment.

$$D_{stat} = \frac{1}{n_{periods}} \int_{t_{start}}^{t_{start}+n_{periods} \cdot t_{periods}} |C_{NOx}(t)| \cdot C_{weighting}(MAF, N) \cdot dt$$

where $n_{periods}$ is the number of complete periods of the lambda controller.

$t_{period}$ is the period time of a complete lambda controller oscillation $t_{start}$ is the start of diagnosis $c_{NOx}$ is the NOx concentration (offset eliminated)

$c_{weighting}$ is the weighting factor.

The NOx concentration $c_{NOx}(t)$, which is measured by means of the NOx sensor 19, for calculation of the diagnosis value $D_{stat}$, is weighted by means of a weighting factor $c_{weighting}$ as a function of the air mass flow rate MAF and the rotational speed N. The weighting factor $c_{weighting}$ is stored in a characteristic diagram KF1 of the memory device 22.

The integration value $D_{stat}$ for an aged exhaust-gas catalytic converter is greater than for a new catalytic converter, on account of the reduced conversion capacity. The diagnosis value $D_{stat}$ is compared with a threshold value $S_{stat\_1}$. If the threshold value $S_{stat\_1}$ S1, which is determined experimentally on the test bench by exhaust-gas tests for an OBD limit catalytic converter and is stored in the memory device 22 is exceeded, the fault indicator device 24 is activated. In parallel, the fact that the threshold value has been exceeded can be input to a fault memory 23, the contents of which are read out during the next servicing of the vehicle, so that a suitable repair can be carried out or the catalytic converter can be exchanged.

It is known that the NOx sensor has a cross-sensitivity in a rich air/fuel mix. Therefore, when there is a rich air/fuel mix, the NOx sensor 19 measures not only the exhaust-gas component NOx, but also the exhaust-gas component HC. However, since the NOx sensor signal in the "rich half-wave" also contains information about the conversion properties of the exhaust-gas catalytic converter (the more HC there is downstream of the catalytic converter, the lower the degree of conversion of the exhaust-gas catalytic converter), it is possible for both half-waves to be evaluated, as described above.

Figure 3:
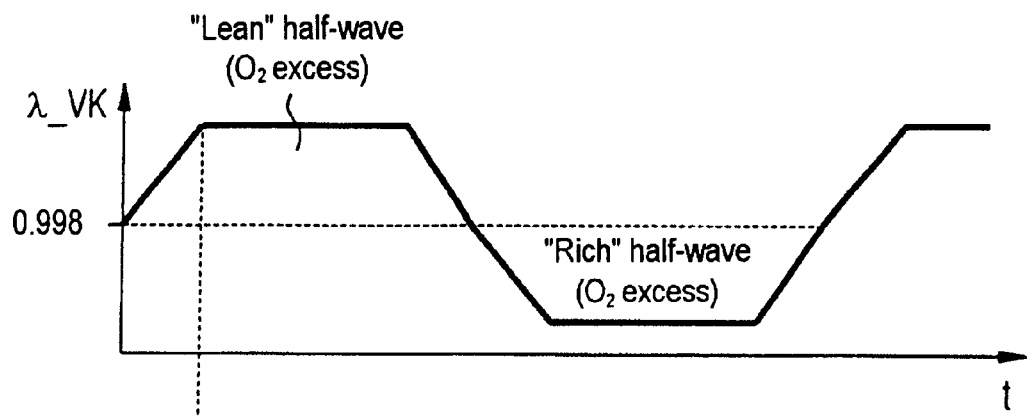
FIG. 3, with its three partial views 3A, 3B, and 3C, shows diagrams illustrating the time curve of the output signal from the lambda sensor upstream of the catalytic converter and from the NOx sensor downstream of the catalytic converter when only one half-wave of the lambda controller oscillation is being evaluated.
Figure 3:
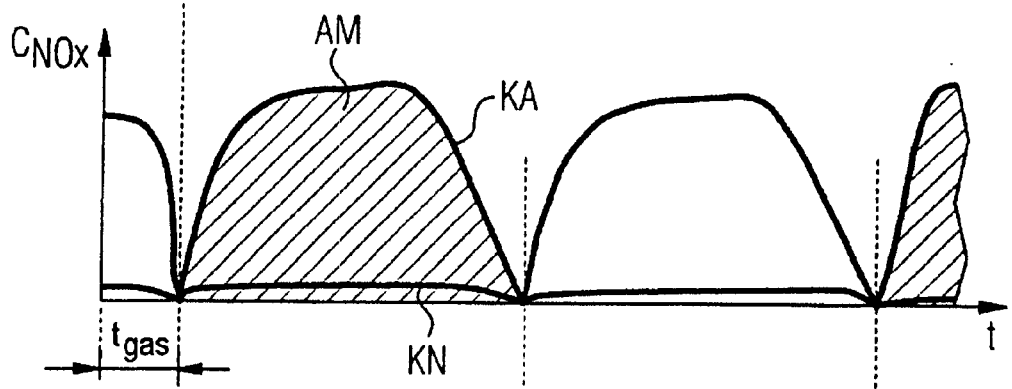
Figure 3:
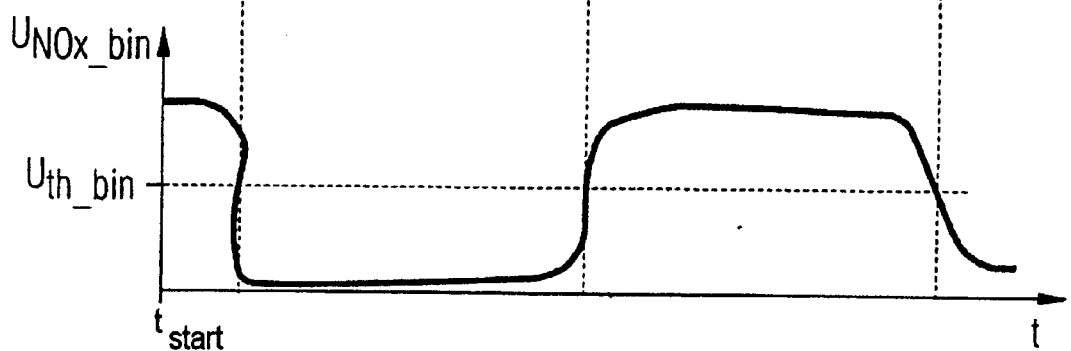

The best possible correlation between NOx sensor signal downstream of the exhaust-gas catalytic converter and the NOx concentration is obtained, however, if the sensor signal is evaluated during the lean half-wave and the sensor signal is suppressed during the rich half-wave. Therefore, in the exemplary embodiment as described with reference to FIG. 3, only the values which are determined during the respective lean half-waves are introduced into the calculation of the diagnosis value.

The reference symbols used in FIGS. 3A and 3B correspond to those used in FIGS. 2A and 2B, except that the rich half-wave is not taken into account. The gas travel time $t_{gas}$ has to be taken into account when assigning the lean half-wave of the signal λ_VK to the respective NOx sensor signal C_NOx. This is achieved by means of the binary signal $U_{NOx\_bin}$ from the NOx sensor 19. This signal $U_{NOx\_bin}$, which is illustrated in FIG. 3C, behaves in a similar way to the signal from a binary lambda sensor. It can be seen from the curve of the binary signal $U_{NOx\_bin}$ whether the air/fuel mix is lean or rich. If a value for $U_{NOx\_bin}$ of lower than a threshold value $U_{th\_bin}$ (typically 600 mV) is detected, the measured NOx sensor signal C_NOx can be assigned to a lean half-wave of the forced excitation and is therefore included in the determination of the diagnosis value. Otherwise, there is a rich air/fuel mix, and the signal C_NOx from the NOx sensor is not used for diagnosis of the exhaust-gas catalytic converter. In the present exemplary embodiment, the diagnosis value is calculated according to the following equation:

$$D_{stat} = \frac{1}{n_{periods}} \int_{t_{start}}^{t_{start}+n_{periods} \cdot t_{periods}} |C_{NOx}(t)| \cdot$$
$$C_{weighting}(MAF, N) \cdot \theta[U_{th\_bin} - U_{nox\_bin}(t)]dt$$

where $n_{periods}$ is the number of complete periods of the lambda controller $t_{periods}$ is the period time of a complete lambda controller oscillation $t_{start}$ is the start of diagnosis $c_{NOx}$ is the NOx concentration (offset eliminated)

$c_{weighting}$ is the weighting factor $U_{th\_bin}$ is the lean threshold of the binary signal from the NOx sensor $U_{nox\_bin}$ is the binary signal from Nox sensor $$\theta(x) = \begin{cases} 1 & \text{for } x \geq 0 \\ 0 & \text{for } x < 0 \end{cases}$$

Heaviside Function

The NOx sensor signal is evaluated only for lean half-waves by means of the Heaviside function. The measured NOx concentration $C_{NOx}(t)$ is in this case weighted as a function of the air mass flow rate MAF and rotational speed N by means of the weighting factor $c_{weighting}$, which is stored as a function of the air mass flow rate MAF and the rotational speed N in the characteristic diagram KF1 of the memory device 22.

The integration value $D_{stat}$ for an aged exhaust-gas catalytic converter is greater than for a new exhaust-gas catalytic converter, on account of the reduced conversion capacity. The diagnosis value $D_{stat}$ is compared with a threshold value $S_{stat\_2}$. If the threshold value $S_{stat\_2}$, which is determined experimentally on the test bench by exhaust-gas tests for an OBD limit catalytic converter and is stored in the memory device 22, is exceeded, the fault display device 24 is activated. In parallel, the fact that the threshold value has been exceeded can be input into a fault memory 23, the contents of which are read out during the next servicing of the vehicle, and a suitable repair can be carried out or the catalytic converter can be exchanged.

It is also possible to combine any desired method for light-off diagnosis of the catalytic converter while the internal combustion engine is warming with the method according to the invention for diagnosis when the internal combustion engine has reached its operating temperature. The following text demonstrates how a total diagnosis value can be formed from the diagnosis during light-off and the diagnosis when the engine is warm.

If $D_{light-off}$ denotes the diagnosis value of a known diagnosis method while the internal combustion engine is warming up and $S_{light-off}$ denotes the diagnosis threshold for a method of this type, as described, for example, in our above-mentioned earlier application 10/042,105 (DE 199 31 321), which is herewith incorporated by reference, a total diagnosis value $D_{total}$ can be formed using the diagnosis value $D_{stat}$ and the diagnosis threshold value $S_{stat}$ in the quasi-steady state by summing the respective quotients of diagnosis value and theshold value:

$$\frac{D_{light-off}}{S_{light-off}} \cdot F_{light-off} + \frac{D_{stat}}{S_{stat}} \cdot F_{stat} = D_{total}$$

Where $S_{stat}$ is the diagnosis threshold value, $D_{stat}$ is the diagnosis value for one of the described diagnosis methods for an internal combustion engine which has reached its operating temperature.

If the total diagnosis value $D_{total}$ exceeds the value of 1, the fault display device 24 is activated. The individual operating phases can be differently weighted during diagnosis by means of the weighting factors $F_{light-off}$ and $F_{stat}$. This is required, since up to 70% of the total emissions in a exhaust-gas test occur during light-off and, moreover, diagnosis during light-off is subject to greater inaccuracy than when internal combustion engine has reached its operating temperature, under quasi-steady-state conditions. The following relationship applies to the weighting factors $F_{light-off}$ and $F_{stat}$:

$$F_{stat} + F_{light-off} = 1$$

We claim:

1. A method of monitoring a conversion capacity of an exhaust-gas catalytic converter of an internal combustion engine, wherein a lambda control device, having a wideband lambda sensor disposed upstream of the exhaust-gas catalytic converter, and regulating an air/fuel ratio to a predeterminable set value, the method which comprises:
   in steady-state operation, and with the internal combustion engine at operating temperature, increasing an oxygen loading of the exhaust-gas catalytic converter to a predetermined value during a diagnosis time by a control intervention of the lambda control device;
   recording a NOx concentration in an exhaust downstream of the three-way exhaust-gas catalytic converter with a NOx sensor during the diagnosis time;
   determining a steady-state diagnosis value from the values of the NOx concentration during at least one lambda controller oscillation;
   comparing the diagnosis value with a predetermined threshold value; and
   if the threshold value is exceeded, concluding that the exhaust-gas catalytic converter has aged.

2. The method according to claim 1, which comprises evaluating a predetermined number of lambda controller oscillations.

3. The method according to claim 1, which comprises evaluating a positive half-wave of the lambda controller oscillation, during which a signal from the lambda sensor indicates a lean air/fuel mix, and a negative half-wave, during which the signal from the lambda sensor indicates a rich air/fuel mix.

4. The method according to claim 1, which comprises evaluating only a positive half-wave of the lambda controller oscillation, during which a signal from the lambda sensor indicates a lean air/fuel mix.

5. The method according to claim 1, which comprises determining the diagnosis value according to the following relationship:

$$D_{stat} = \frac{1}{n_{periods}} \int_{t_{start}}^{t_{start}+n_{periods}\cdot t_{periods}} |C_{NOx}(t)| \cdot C_{weighting}(MAF, N) \cdot dt$$

where
   $D_{stat}$ is the diagnosis value;
   $n_{periods}$ is a number of complete periods of the lambda controller;
   $t_{period}$ is a period time of a complete lambda controller oscillation;
   $t_{start}$ is a start of diagnosis;
   $c_{NOx}$ is the NOx concentration; and
   $c_{weighting}$ is a weighting factor.

6. The method according to claim 1, which comprises determining the diagnosis value according to the following relationship:

$$D_{stat} = \frac{1}{n_{periods}} \int_{t_{start}}^{t_{start}+n_{periods}\cdot t_{periods}} |C_{NOx}(t)| \cdot C_{weighting}(MAF, N) \cdot \theta[U_{th\_bin} - U_{nox\_bin}(t)] dt$$

where
   $D_{stat}$ is the diagnosis value;
   $n_{periods}$ is a number of complete periods of the lambda controller;
   $t_{period}$ is a period time of a complete lambda controller oscillation;
   $t_{start}$ is a start of diagnosis;
   $C_{NOx}$ is the NOx concentration;
   $c_{weighting}$ is a weighting factor;
   $U_{th\_bin}$ is a lean threshold for the binary signal of the NOx sensor;
   $U_{nox\_bin}$ is a binary signal from the NOx sensor; and $$\theta(x) = \begin{cases} 1 & \text{for } x \geq 0 \\ 0 & \text{for } x < 0 \end{cases}.$$

7. The method according to claim 1, which comprises choosing for the predetermined value an oxygen loading at which there is as yet no noticeable rise in the Nox concentration downstream of the exhaust-gas catalytic converter for a new exhaust-gas catalytic converter.

8. The method according to claim 7, which comprises determining the predetermined value experimentally and storing the value in a memory device of a control device controlling the internal combustion engine.

9. The method according to claim 1, which comprises choosing for the predetermined value an oxygen loading at which there is as yet no noticeable rise in the NOx concentration downstream of the exhaust-gas catalytic converter for a borderline catalytic converter that is still classified as functional.

10. The method according to claim 9, which comprises determining the predetermined value experimentally and storing the value in a memory device of a control device controlling the internal combustion engine.

11. The method according to claim 1, which comprises linking the diagnosis value for steady-state operation of the internal combustion engine to a diagnosis value while the internal combustion engine is warming up, to form a total diagnosis value.

12. The method according to claim 11, which comprises forming the total diagnosis value according to the following relationship:

$$\frac{D_{light-off}}{S_{light-off}} \cdot F_{light-off} + \frac{D_{stat}}{S_{stat}} \cdot F_{stat} = D_{total}$$

where $D_{total}$ is the total diagnosis value;

$D_{light-off}$ is a diagnosis value for a known diagnosis method while the internal combustion engine is warming up;

$S_{light-off}$ is a diagnosis threshold for a method of this type; and $F_{light-off}$, $F_{stat}$ are weighting factors.

13. The method according to claim 12, which comprises comparing the total diagnosis value $D_{total}$ with a threshold value, and activating a fault indicator device when the threshold value is exceeded.

* * * * *